(12) United States Patent
Nakamura

(10) Patent No.: US 7,958,269 B2
(45) Date of Patent: Jun. 7, 2011

(54) NETWORK CAMERA HAVING NETWORK FAILURE RECOVERY

(75) Inventor: Minoru Nakamura, Kanagawa (JP)

(73) Assignee: Sony Corporation, Tokyo (JP)

(*) Notice: Subject to any disclaimer, the term of this patent is extended or adjusted under 35 U.S.C. 154(b) by 586 days.

(21) Appl. No.: 10/880,116

(22) Filed: Jun. 29, 2004

(65) Prior Publication Data

US 2005/0044258 A1    Feb. 24, 2005

(30) Foreign Application Priority Data

Jun. 30, 2003  (JP) .................................. 2003-188464

(51) Int. Cl.
- *G06F 15/16* (2006.01)
- *G06F 15/173* (2006.01)
- *H04N 5/222* (2006.01)
- *H04L 12/28* (2006.01)
- *H04L 12/56* (2006.01)

(52) U.S. Cl. ... 709/247; 709/224; 709/232; 348/333.11; 370/401

(58) Field of Classification Search .................. 709/247, 709/224, 232; 348/333.11; 370/229, 235, 370/352, 401

See application file for complete search history.

(56) References Cited

U.S. PATENT DOCUMENTS

| | | | | |
|---|---|---|---|---|
| 5,583,796 A | * | 12/1996 | Reese | 702/185 |
| 6,628,610 B1 | * | 9/2003 | Waclawsky et al. | 370/229 |
| 2001/0024232 A1 | * | 9/2001 | Suzuki | 348/207 |
| 2003/0007785 A1 | * | 1/2003 | Shimizu | 386/117 |
| 2003/0043272 A1 | * | 3/2003 | Nagao et al. | 348/207.1 |
| 2003/0146976 A1 | * | 8/2003 | Liu | 348/207.1 |
| 2003/0214670 A1 | * | 11/2003 | Ohmura | 358/1.15 |
| 2004/0105450 A1 | * | 6/2004 | Ikuta et al. | 370/401 |
| 2005/0033745 A1 | * | 2/2005 | Wiener et al. | 707/10 |
| 2005/0099519 A1 | * | 5/2005 | Creamer et al. | 348/333.11 |
| 2006/0015632 A1 | * | 1/2006 | Tiemann et al. | 709/230 |

FOREIGN PATENT DOCUMENTS

| | | |
|---|---|---|
| JP | 7 141498 | 6/1995 |
| JP | 2002-202994 | 7/2002 |
| JP | 2002-354443 | 12/2002 |
| JP | 2003 18525 | 1/2003 |

* cited by examiner

*Primary Examiner* — Phuoc Nguyen
*Assistant Examiner* — Kishin G Belani
(74) *Attorney, Agent, or Firm* — Frommer Lawrence & Haug LLP; William S. Frommer; Paul A. Levy

(57) ABSTRACT

A network camera 1 comprises a camera block 10 for taking an image, a signal processing unit 20 supplied with an imaging output of the camera block 10, a communication interface unit 30 which connects to an external network to establish communication, a backup memory unit 40 which temporarily stores data to be transmitted to an external device via the communication interface unit 30, a system control unit 50 which controls the above components, and the like. The system control unit 50 monitors the state of the network and stores temporarily the compressed image data to be transmitted to the server in the backup memory unit 40 when a failure occurs in the network, and controls transmission processing such that the compressed image data that has been stored in the backup memory unit 40 is transmitted to the server after the network has recovered.

4 Claims, 10 Drawing Sheets

NETWORK CAMERA HAVING NETWORK FAILURE RECOVERY

BACKGROUND OF THE INVENTION

1. Field of the Invention

The present invention relates to a network camera which transmits image data in real time to a server connected thereto via a network such as the Internet.

This application claims priority of Japanese Patent Application No. 2003-188464, filed in Japan on Jun. 30, 2003, the entirety of which is incorporated by reference herein.

2. Description of the Related Art

In recent years, broadband environment such as an ADSL (Asymmetric Digital Subscriber Line) has become widespread, and a network camera has accordingly come into use, which allows, for example, viewing of the images that are transmitted, through the Internet, from the remotely located network camera on the screen of a personal computer or mobile phone, or viewing of the images transferred from the network camera located within a LAN (Local Area Network) installed in a factory or company on the screen of the personal computer. An image pickup screen of the network camera can be moved by remote control such as pan/tilt operation, allowing wide-area viewing.

Some of the above network camera applications are set as an FTP (File Transfer Protocol) client to upload image data to an FTP server installed on a network.

FTP is defined in RFC (Requests For Comment) 959 published by IETF (Internet Engineering Task Force), which is a consortium established for the purpose of advancing standardization of new technologies available on the Internet. FTP is a protocol (or command that implements the FTP protocol) for file transfer between a client and a host computer on a TCP/IP (Transmission Control Protocol/Internet Protocol) network such as the Internet or intranet, and has been used on the Internet as frequently as an HTTP (HyperText Transfer Protocol) or an SMTP (Simple Mail Transfer Protocol)/POP (Post Office Protocol).

There is a possibility that a network for data transfer is temporarily out of service for many reasons. It is known that ADSL transmission, which has become increasingly widespread in recent years, is weak against electromagnetic noise, and accordingly, a line fault frequently occurs depending on the installation environment. Further, a network is constructed and managed by various kinds of equipments, and there is also a case where a network line is out of service due to maintenance of these equipments. When the network breakdown occurs in a conventional FTP client/server system, the image data being transferred during this breakdown time is treated as send error, with the result that the image data will not be transmitted to the FTP server. A loss of the required image data is a serious problem in a security monitoring system, which poses a major obstruction to an introduction of the network camera to a security system.

SUMMARY OF THE INVENTION

In view of the above situation, an object of the present invention is to enable a network camera (FTP client) for use in an FTP client/server system to back up image data when a network line for the system is temporarily out of service.

Another object of the present invention is to enable an adequate control of the load on the FTP server or the bandwidth used in the network line.

Still another object of the present invention is to effectively utilize the life of a memory, even when a recording medium, such as a flash memory having reduced number of times of data writing is used as a backup memory.

According to the present invention, there is provided a network camera configured to transmit image data in real time to a server connected thereto via a network, comprising: an imaging means; a data compression means for converting the image data obtained by the imaging means into compressed image data; a network interface means for communicating with the server via the network; a control means for controlling transmission processing such that the compressed image data obtained by the data compression means is transmitted to the server via the network interface means; and a data store means for storing the compressed image data to be transmitted to the server when a failure occurs in the network and the compressed image data cannot be transferred in real time to the server, wherein the control means which monitors the state of the network stores the compressed image data to be transmitted to the server in the data store means when a failure occurs in the network, and controls transmission processing such that the compressed image data that has been stored in the data store means is transmitted to the server via the network interface means after the network has recovered.

In the network camera according to the present invention, for example, the transmission interval at which the compressed image data is transmitted to the server via the network interface means is made variable, and the control means controls transmission processing such that the compressed image data that has been stored in the data store means is transmitted at a transmission interval shorter than a normal transmission interval at the time of recovery of the network.

Further, in the network camera according to the present invention, for example, a transmission period during which image data is transmitted in real time to the server connected to the network camera via the network and a transmission break period during which real-time transmission is not performed are provided, and when the compressed image data exists in the data store means, the control means controls transmission processing such that the stored image data is transmitted to the server via the network interface means during the transmission break period.

Further, in the network camera according to the present invention, for example, the control means exercises control by switching between a first and second control modes. That is, in the first control mode where the transmission interval at which the compressed image data is transmitted to the server via the network interface means is made variable, the control means controls transmission processing such that the compressed image data that has been stored in the data store means is transmitted at a transmission interval shorter than a normal transmission interval at the time of recovery of the network; and in the second control mode where a transmission period during which image data is transmitted in real time to the server connected to the network camera via the network interface means and a transmission break period during which real-time transmission is not performed are provided, the control means controls transmission processing such that the compressed image data that has been stored in the data store means is transmitted to the server via the network interface means during the transmission break period when the compressed image data exists in the data store means.

With the above configuration, even when a network line is temporarily out of service, a network camera according to the present invention can back up image data during the network breakdown on a memory thereof and transmit the backed up image data to a server after the network line has recovered.

As described above, according to the present invention, even when a network line is temporarily out of service, image data can be backed up on the network camera (FTP client) side, in the FTP client/server system using the network camera.

Further, by individually setting a transmission time interval during normal time and a transmission time interval at the time of occurrence of backup data, load on the FTP server and bandwidth used in the network line can adequately be controlled.

Further, image data is backed up on a backup memory unit only during network breakdown, thereby maximizing the use of the life of a memory when a recording medium, such as a flash memory having reduced number of times of data writing is used as a backup memory.

DETAILED DESCRIPTION OF THE PREFERRED EMBODIMENTS

An embodiment of the present invention will be described in detail with reference to the accompanying drawings.

Figure 1:
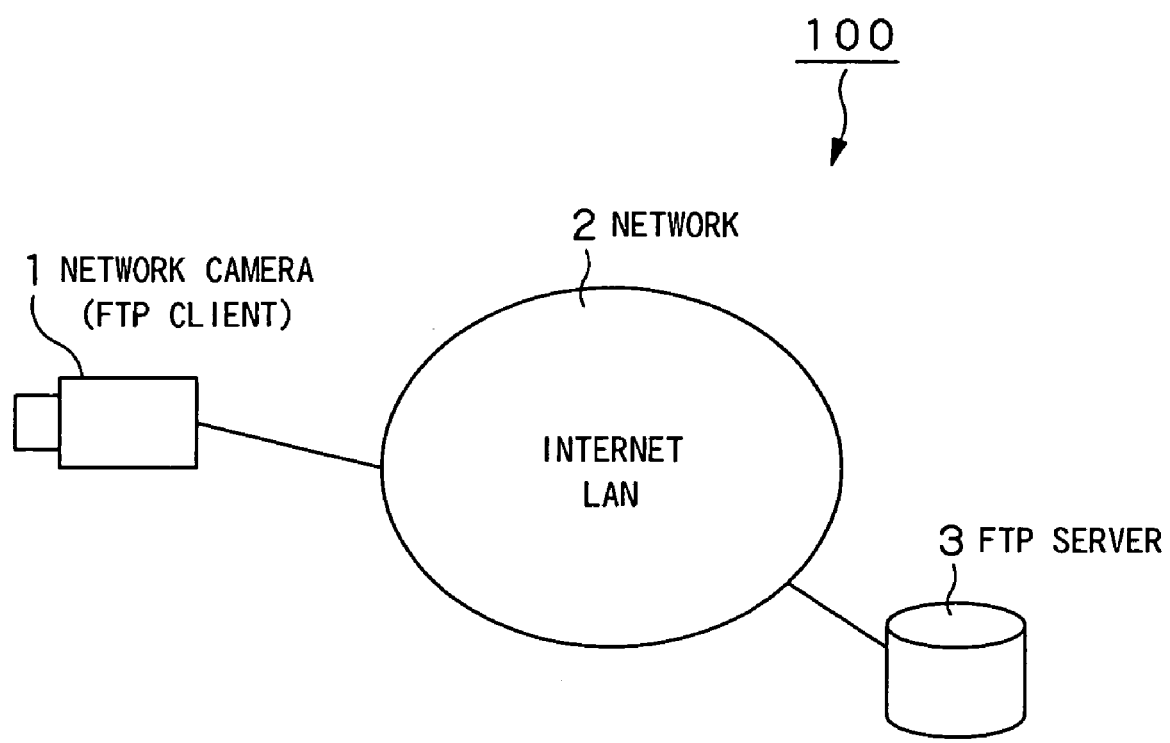
FIG. 1 is a block diagram showing a configuration example of a client/server system to which the present invention is applied.

The present invention is applied to a client/server system 100 having a configuration as shown in, for example, FIG. 1.

The client/server system 100 is an FTP (File Transfer Protocol) client/server system configured to upload real-time image data obtained by a network camera 1 connected to a network 2 such as the Internet or a LAN to a server 3 connected to the same network 2 using FTP. More specifically, the client/server system 100 is used for, for example, a monitoring system or real-time monitoring system in which the network camera 1 serving as an FTP client on the network 2 uploads image data to the FTP server 3 on the same network 2.

Figure 2:
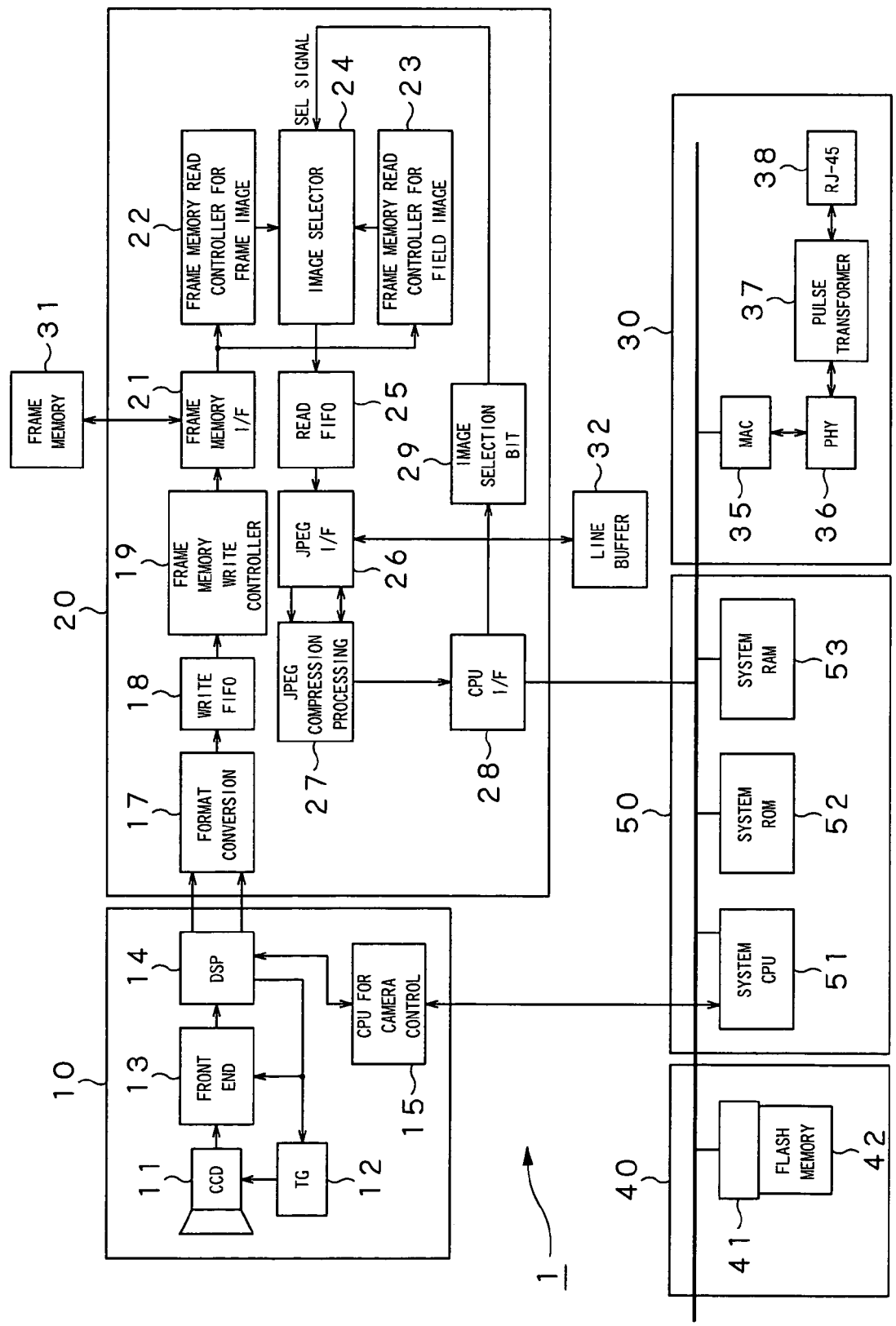
FIG. 2 is a block diagram showing a configuration example of a network camera in the client/server system.

As shown in FIG. 2, the network camera 1 comprises a camera block 10 for taking an image, a signal processing unit 20 supplied with an imaging output of the camera block 10, a communication interface unit 30 which connects to an external network to establish communication, a backup memory unit 40 which temporarily stores data to be transmitted to an external device via the communication interface unit 30, a system control unit 50 which controls the above components, and the like.

The camera block 10 comprises an interline-type CCD image sensor 11, a timing generator 12 which actuates the interline-type CCD image sensor 11, a front-end section 13 supplied with an imaging output of the interline-type CCD image sensor 11, a digital signal processing section 14 supplied with an output of the front-end section 13, a CPU 15 for camera control which controls performance of the digital signal processing section 14 and performs camera control such as white balance, focusing, or the like based on information from the digital signal processing section 14, and the like.

The interline-type CCD image sensor 11 of the camera block 10, which is configured to perform photo-electric conversion in a field period to provide an interlace output, that is, to alternately provide an imaging output of odd-number field and one of even-number field that constitute one frame, sequentially outputs an analog imaging signal as an imaging output of each field. The front-end section 13 is constituted by an A/D converter or the like which samples/holds the analog imaging signal from the interline-type CCD image sensor 11 and performs analog/digital conversion of the analog imaging signal. The digital signal processing section 14 applies digital signal processing to the digitized imaging signal from the front-end section 13 to output an interlace YUV (4:1:1) digital image signal.

The signal processing unit 20 comprises: a format conversion section 17 supplied with the interlace YUV (4:1:1) digital image signal from the digital signal processing section 14 of the camera block 10; a write FIFO memory 18 supplied with an output of the format conversion section 17; a frame memory write controller 19 supplied with an output of the write FIFO memory 18; a frame memory interface section 21 supplied with an output of the frame memory write controller 19; a frame memory 31 connected to the frame memory interface section 21; a frame memory read controller 22 for frame image and a frame memory read controller 23 for field image which are supplied with an output of the frame memory interface section 21; a read FIFO memory 25 selectively supplied with an output of the frame memory read controller 22 for frame image or an output of the frame memory read controller 23 for field image via an image selector 24; a JPEG I/F section 26 supplied with an output of the read FIFO memory 25; a JPEG compression processing section 27 and a line buffer memory 32 which are connected to the JPEG I/F section 26; a CPU I/F section 28 supplied with an output of the JPEG compression processing section 27; image selection bit register 29 connected to the CPU I/F section 28 and the like.

The format conversion section 17 of the signal processing unit 20 converts the interlace YUV (4:1:1) digital image signal from the digital signal processing section 14 into a YCbCr (4:2:2) signal for JPEG compression.

The write FIFO memory 18 eliminates the difference between a transfer rate of the signal from the camera block 10 and a speed at which the signal is written into the frame memory 31. The frame memory write controller 19 controls write operation such that a YCbCr (4:2:2) signal supplied via the write FIFO memory 18 from the format conversion section 17 is written into the frame memory 31 via the frame memory interface section 21 in order to convert the YCbCr (4:2:2) signal from an interlace signal to a non-interlace signal.

The frame memory interface section 21 controls write, read, and refresh operation with respect to the frame memory 31 in a time-division manner.

The frame memory read controller 22 for frame image controls readout operation such that a first field image and second field image are read out as one frame image from the frame memory 31 via the frame memory interface section 21.

The frame memory read controller 23 for field image controls readout operation such that one of a first field image and second field image is read out from the frame memory 31 via the frame memory interface section 21.

The image selector 24 selects, according to a sel signal based on an image selection bit to be supplied to the image selection bit register 29 from the CPU 51 for system control of the system control unit 50 via the CPU I/F section 28, a YCbCr (4:2:2) signal of the frame image read out from the frame memory 31 by the frame memory read controller 22 for frame image or a YCbCr (4:2:2) signal of the field image read out from the frame memory 31 by the frame memory read controller 23 for field image.

The read FIFO memory 25 eliminates the difference between a transfer rate of the YCbCr (4:2:2) signal of the frame image or field image read out from the frame memory 31 and a rate of JPEG compression. The JPEG I/F section 26 temporarily stores the YCbCr (4:2:2) signal of the frame image or field image supplied via the image selector 24 in the line buffer memory 32, applies raster block conversion, and inputs the resultant signal into the JPEG compression processing section 27, and controls performance of the JPEG compression processing section 27. The JPEG compression processing section 27 applies compression processing conforming to JPEG to the raster block converted YCbCr (4:2:2) signal. An output of the JPEG compression processing section 27, that is, JPEG compressed image data is written into a system RAM 52 of the system control unit 50 via the CPU I/F section 28.

The JPEG compressed image data is directly written into the system RAM 52 using a DMA function of the CPU 51 for system control or is written into the system RAM 52 via the CPU 51 for system control.

The communication interface unit 30 comprises an Ethernet® controller (MAC) 35 for network interface, a physical layer chip 36, a pulse transformer 37 for impedance matching, an RJ-45 connector 38, and the like.

The backup memory unit 40 serves as a data store means for temporarily storing the compressed image data to be transmitted to the server 3 when a failure occurs in the network 2 and thereby the compressed image data cannot be transmitted in real time to the server 3, and is connected to the communication interface unit 30 and the system control unit 50 via a bus. As a backup memory, an SDRAM, a hard disk, a flash memory or the like is used.

In this embodiment, a flash memory 42 detachably attached to a slot 41 connected to a bus is used as a backup memory in the backup memory unit 40 of the client/server system 100.

The system control unit 50 comprises a CPU 51 for system control, a system RAM 52 for buffer and working area, a system ROM 53 for program, which are connected to each other via a bus. The CPU 51 for system control is in charge of system control and communication between the system control unit 50 and the CPU 15 for camera control.

The network camera 1 serving as an FTP client converts the imaging output obtained in real time by the camera block 10 into JPEG compressed image data using the signal processing unit 20, and transmits the JPEG compressed image data to the FTP server 3 via the communication interface unit 30 at a predetermined interval.

Figure 3:
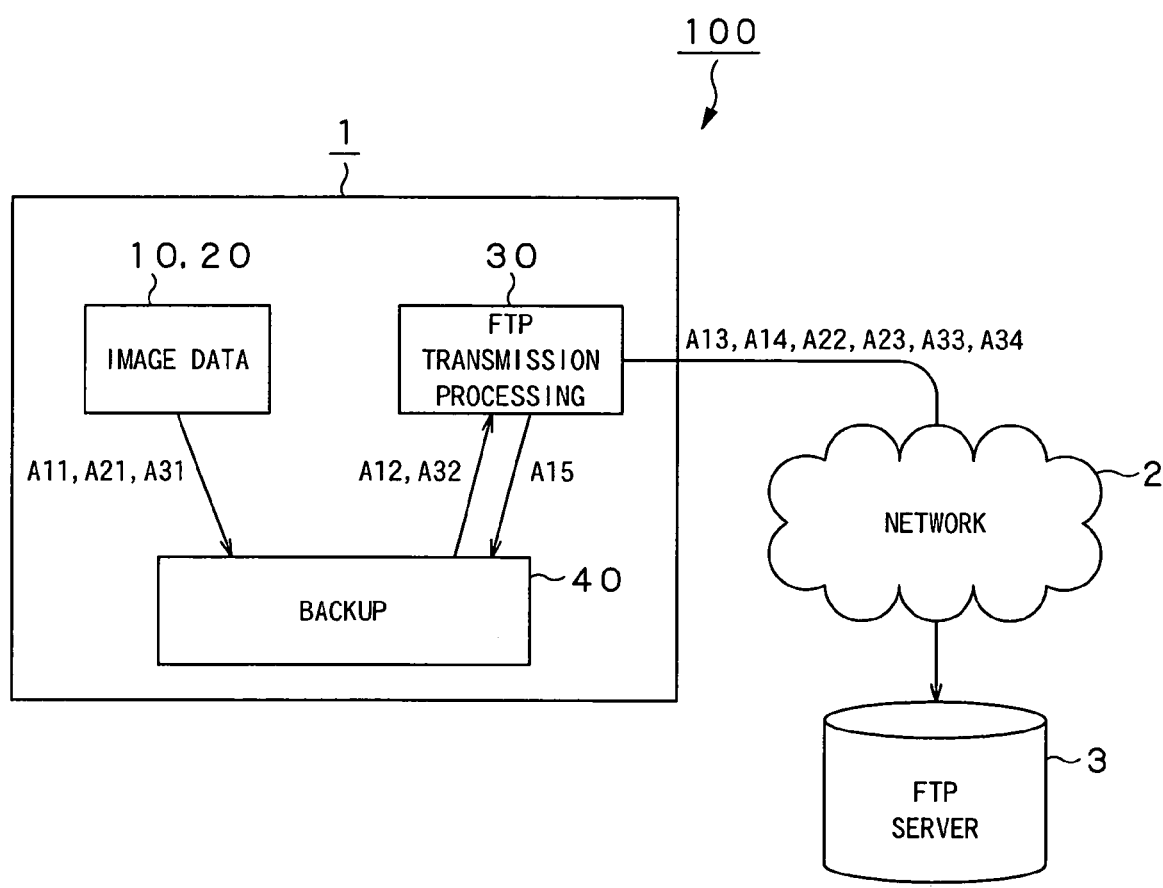
FIG. 3 is a view for explaining an image data transmission processing algorithm A in the client/server system.

An image data transmission processing algorithm A in the client/server system 100 will be described with reference to FIG. 3.

Figure 4:
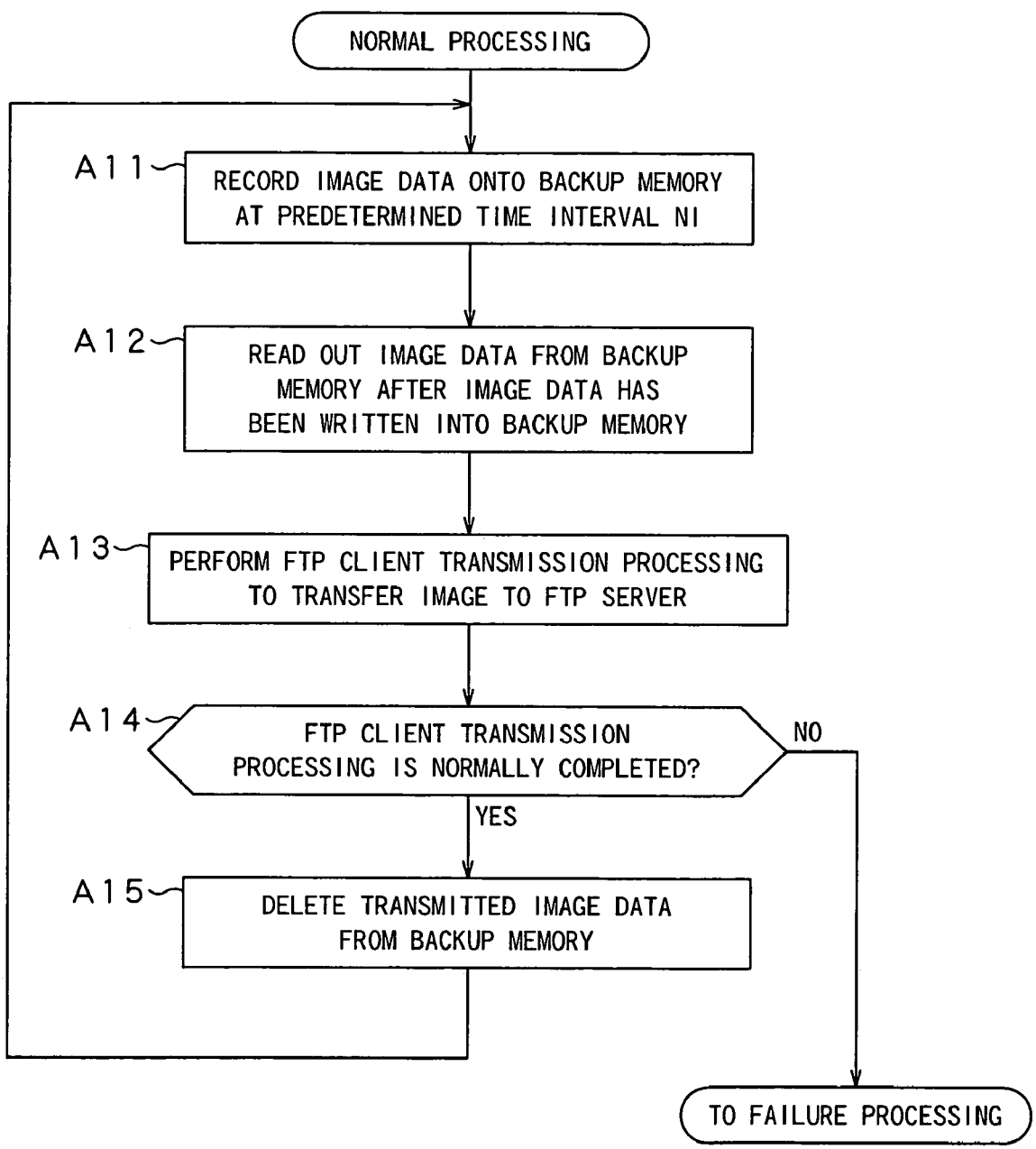
FIG. 4 is a flowchart showing a procedure of image data transmission processing when a network line is in normal state in the client/server system.

The system control unit 50 performs transmission processing by repeating the procedure (steps A11 to A15) shown in the flowchart of FIG. 4 in normal time, that is when the network line normally functions.

That is, the imaging output obtained in real time by the camera block 10 is converted into JPEG compressed image data in the signal processing unit 20, followed by being written into the backup memory unit 40 at a predetermined time interval NI (6 seconds, for example) (step A11).

After the image data has been written into the backup memory unit 40, the system control unit 50 reads out the image data from the backup memory 40 (step A12) and performs FTP client transmission processing to transmit the read out image data to the FTP server 3 via the communication interface unit 30 (step A13).

The system control unit 50 monitors the network line and determines whether the FTP client transmission processing is normally completed (step A14).

When determining that the FTP client transmission processing has been normally completed, the system control unit 50 deletes, from the backup memory unit 40, the image data that has been transmitted to the server 3 (step A15), and returns to step A11.

Figure 5:
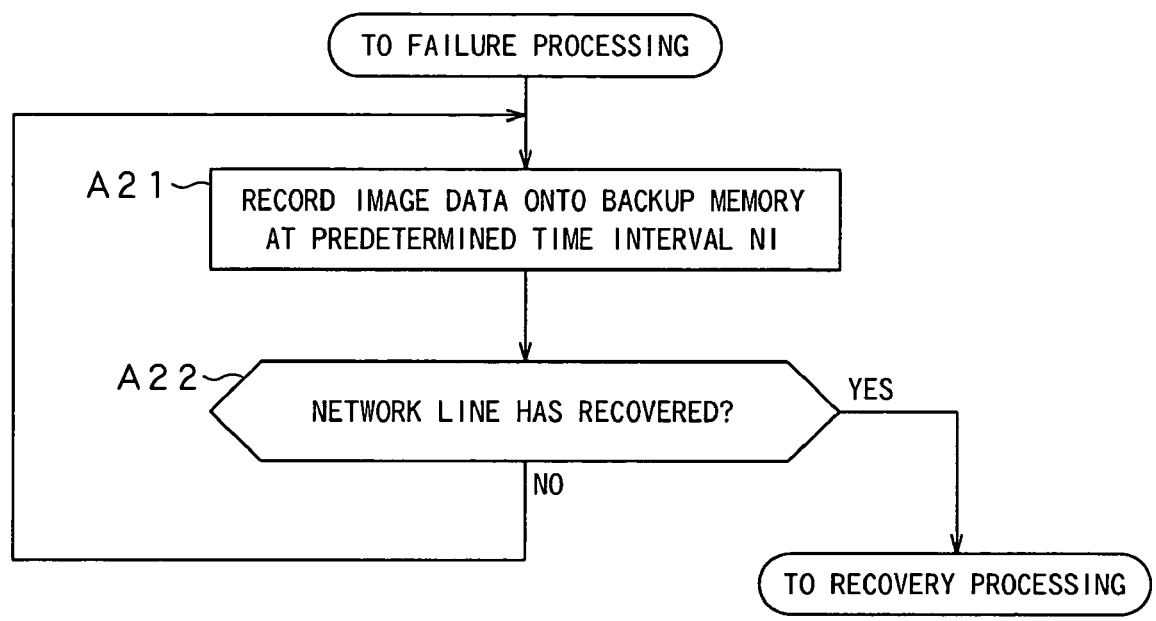
FIG. 5 is a flowchart showing a procedure of failure processing executed when a failure has occurred in the network line in the client/server system.

When determining, in step A14, that the FTP client transmission processing has not been performed normally, the system control unit 50 assumes that a failure has occurred in the network line, and shifts to failure processing. The system control unit 50 then repeats the procedure (steps A21 to A22) shown in the flowchart of FIG. 5 to perform the failure processing so as to store, in the backup memory unit 40, the compressed image data to be transmitted to the FTP server 3.

That is, the imaging output obtained in real time by the camera block 10 is converted into JPEG compressed image data in the signal processing unit 20, followed by being written into the backup memory unit 40 at a predetermined time interval NI (6 seconds, for example) (step A21).

The system control unit 50 monitors the network line and determines whether the network 2 has recovered from the failure based on the state of the FTP client transmission processing (step A22). When determining that the network line has not yet recovered, the system control unit 50 returns to step A11.

Figure 6:
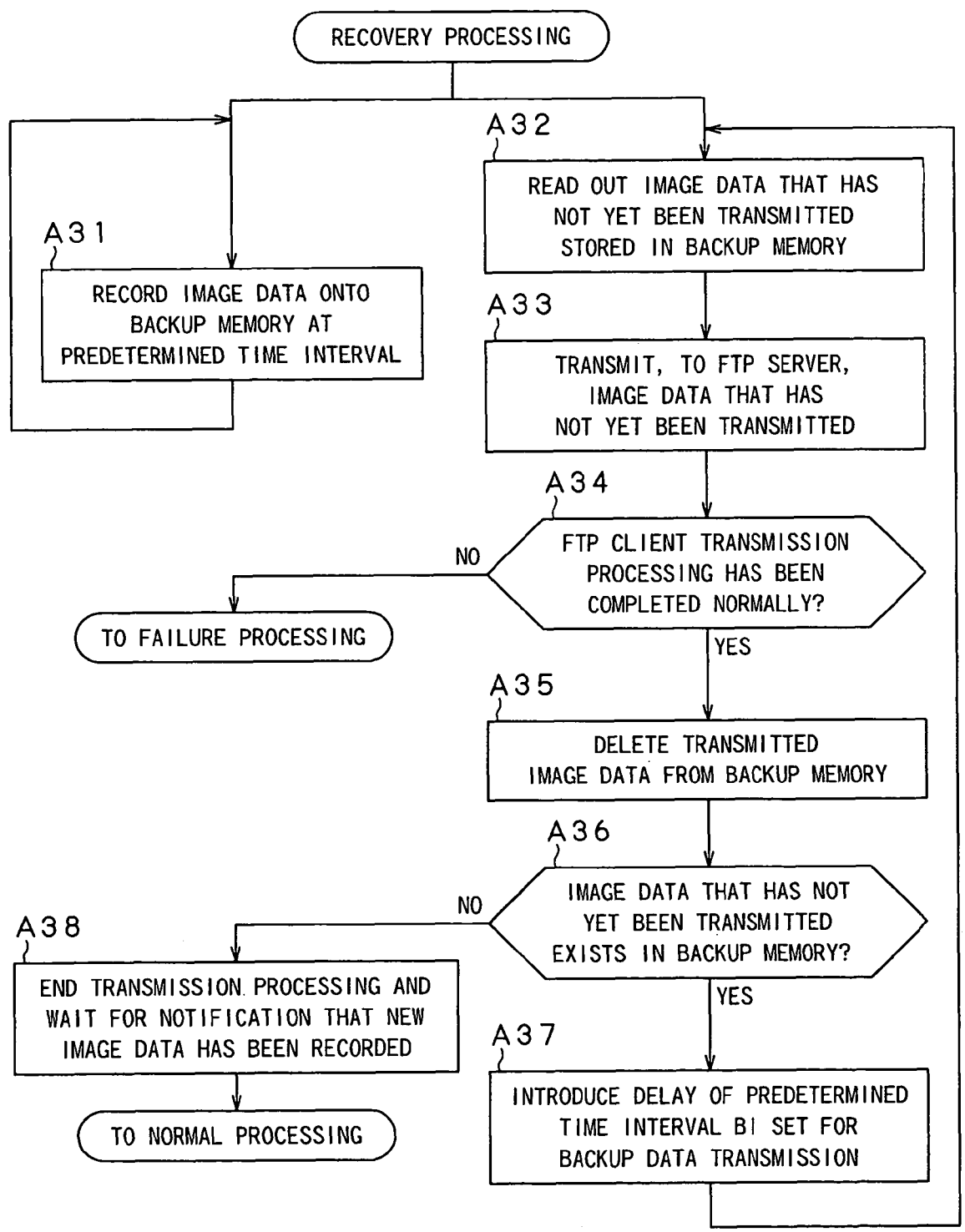
FIG. 6 is a flowchart showing a procedure of recovery processing executed when the network has recovered in the client/server system.

When determining, in step A22, that the network line has recovered from the failure, the system control unit 50 shifts to recovery processing and repeats the procedure (steps A31 to A37) shown in the flowchart of FIG. 6 to perform the recovery processing so as to transmit the image data stored in the backup memory unit 40 at the time of occurrence of the failure to the FTP server 3.

Upon entering the recovery processing mode, the system control unit 50 converts the imaging output obtained in real time by the camera block 10 into JPEG compressed image data using the signal processing unit 20 and writes the JPEG compressed image data into the backup memory unit 40 at a predetermined time interval NI (6 seconds, for example) (step A31). At the same time, the system control unit 50 reads out, from the backup memory unit 40, the image data that has not yet been transmitted (step A32) and transmits the readout image data to the FTP server 3 via the communication interface unit 30 (step A33).

The system control unit 50 monitors the network line and determines whether the FTP client transmission processing has been completed normally (step A34).

When determining "No" in step A34, that is, determining that the FTP client transmission processing has not been performed normally, the system control unit 50 assumes that a failure has occurred in the network line and shifts to the failure processing. There, the system control unit 50 repeats the procedure (steps A21 to A22) in the flowchart of FIG. 5 to perform the failure processing.

When determining "Yes" in step A34, that is, determining that the FTP client transmission processing has been completed normally, the system control unit 50 deletes, from the backup memory unit 40, the image data that has been transmitted to the FTP server 3 (step A35) and determines whether the image data that has not yet been transmitted exists in the backup memory unit 40 (step A36).

When determining "Yes" in step A35, that is, determining that the image data that has not yet been transmitted exists in the backup memory unit 40, the system control unit 50 introduces a delay of a time interval BI (3 seconds, for example) set for backup data transmission (step A37). After that, the system control unit 50 returns to step A32 and performs the FTP client transmission processing with respect to the image data that has not yet been transmitted.

The system control unit 50 repeats the procedure from steps A32 to A37 to perform the FTP client transmission so as to transmit the image data that has not yet been transmitted and left in the backup memory unit 40 at a time interval BI (3 seconds, for example) set for backup data transmission. When determining "No" in step A35, that is, determining that the image data that has not yet been transmitted does not exist in the backup memory unit 40, the system control unit 50 ends the recovery processing. When new image data has been recorded (step A38), the system control unit 50 returns to the normal processing and repeats the procedure (steps A11 to A14) to perform normal transmission processing.

Figure 7:
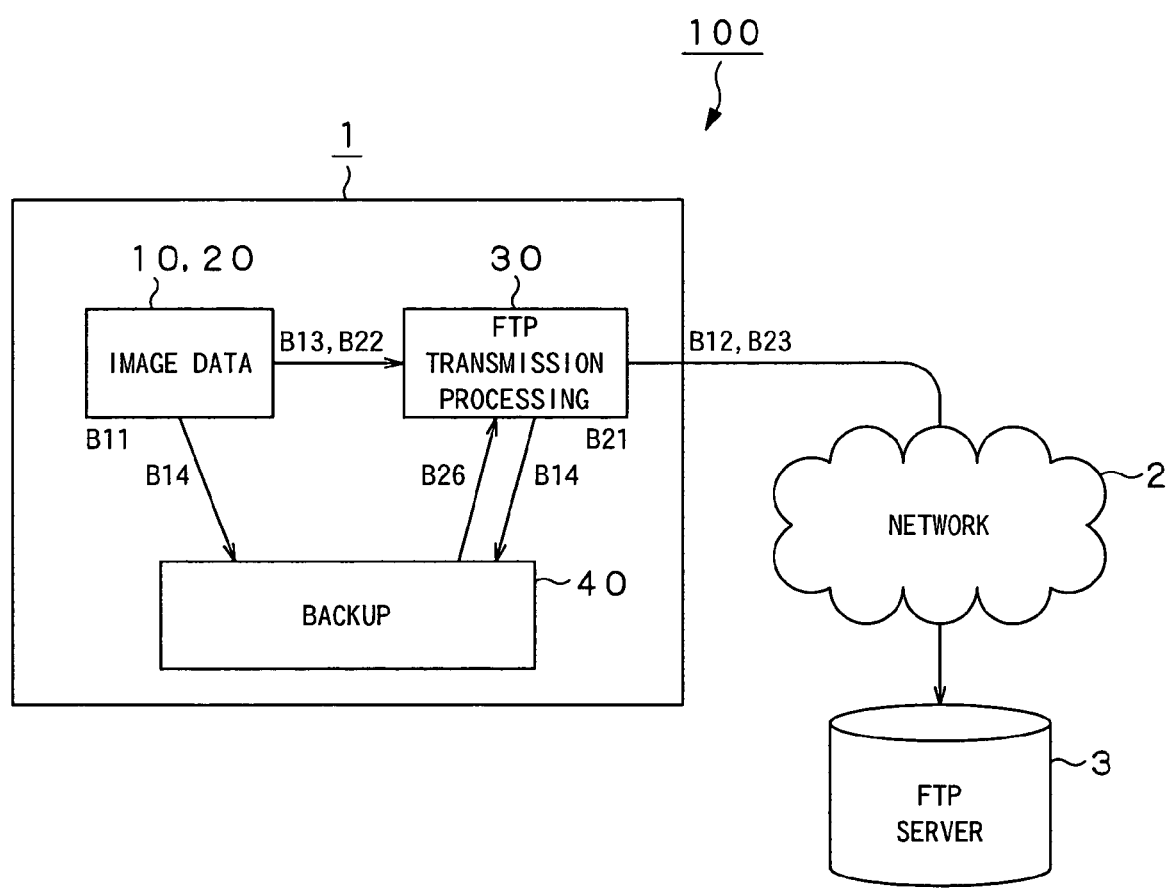
FIG. 7 is a view for explaining an image data transmission processing algorithm B which considers the life of a backup memory in the client/server system.

In the aforementioned transmission processing algorithm A described with reference to FIG. 3, image data is always written into the backup memory unit 40 regardless of the state of the network line. Therefore, when a recording medium, such as a flash memory having reduced number of times of data writing is used as a backup memory, the memory may reach the end of its life immediately depending on the recording condition. A processing algorithm B that has been made to prevent this will be described with reference to FIG. 7.

Figure 8:
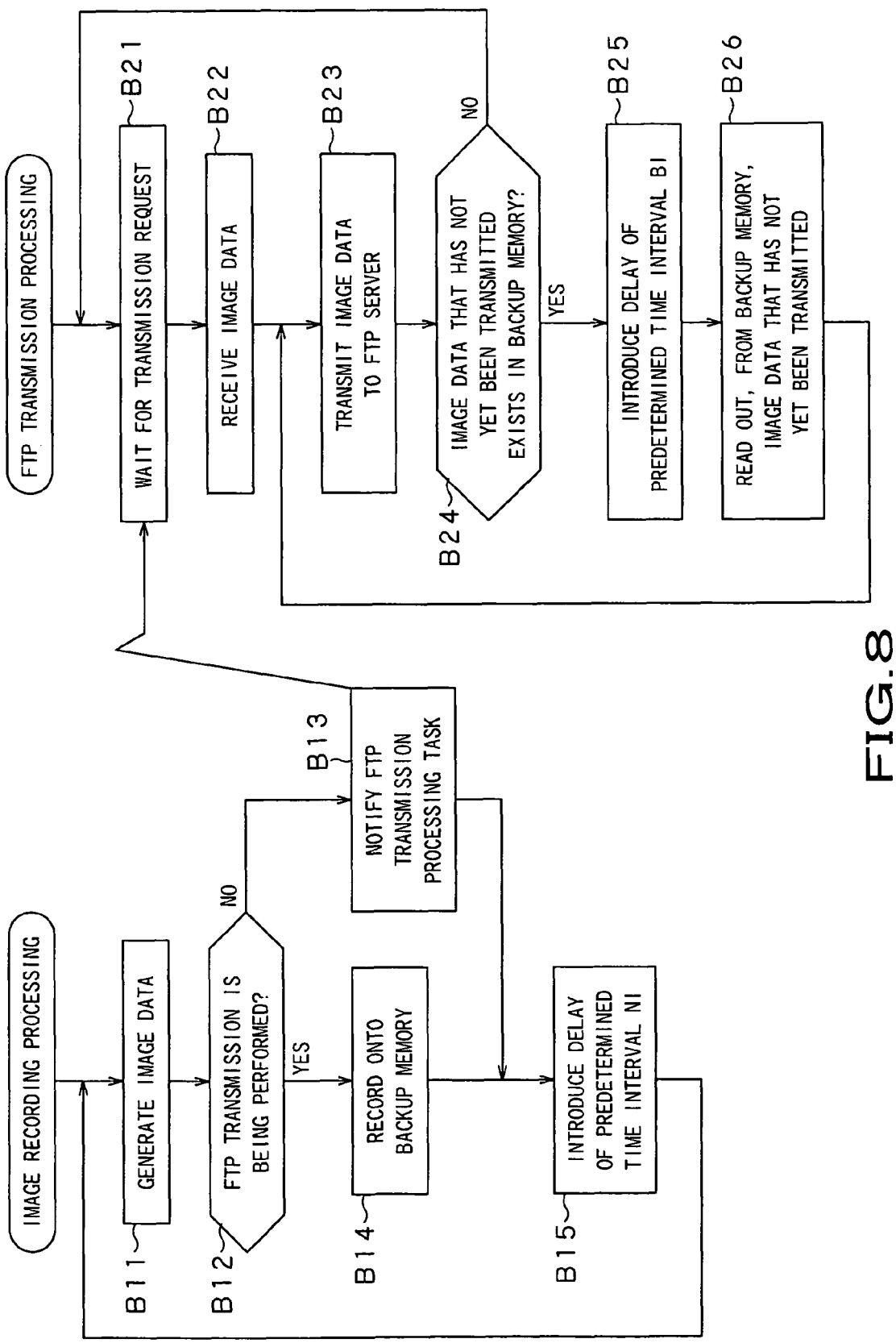
FIG. 8 is a flowchart showing a procedure of transmission processing according to the transmission processing algorithm B.

That is, image recording processing (steps B11 to B15) and FTP transmission processing (steps B21 to B26) are repeated according to the procedure shown in the flowchart of FIG. 8, and image data is backed up on the backup memory unit 40 only during network breakdown, thereby maximizing the use of the life of a memory.

In the image recording processing, when the JPEG compressed image data to be transmitted is generated by the signal processing unit 20 from the imaging output obtained in real time by the camera block 10 (step B11), the system control unit 50 determines whether the FTP client transmission processing is being performed by the communication interface unit 30 (step B12). When determining "No" in step B12, that is, determining that the FTP client transmission processing has been ended, the system control unit 50 notifies an FTP client transmission processing task of the communication interface unit 30 that the JPEG compressed image data has been generated (step B13). When determining "Yes" in step B12, that is, determining that the FTP client transmission processing is in execution, the system control unit 50 assumes that a failure has occurred in the network line and writes the JPEG compressed image data to be transmitted into the backup memory unit 40 (step B14). After that, the system control unit 50 introduces a delay of a predetermined time interval NI (6 seconds, for example) (step B15) and returns to step B11.

In the image recording processing, every time the system control unit 50 repeats the procedure from steps B11 to B15 (through steps B12 and B13) in normal time in which a fault does not occurs in the network line, it notifies, at a predetermined time interval NI (6 seconds, for example), the FTP client transmission processing task of the communication interface unit 30 that the JPEG compressed image data to be transmitted has been generated.

Further, in the image recording processing, when a failure has occurred in the network line and thereby the FTP client transmission processing is not ended, the system control unit 50 repeats the procedure from steps B11 to B15 (through steps B12 and B14) to store the JPEG compressed image data to be transmitted that is generated, at a predetermined time interval NI (6 seconds, for example), by the signal processing unit 20 in the backup memory unit 40.

The FTP client transmission processing task of the communication interface unit 30 waits for a transmission request (step B21). When receiving the transmission request, the FTP client transmission processing task receives, from the signal processing unit 20, the JPEG compressed image data to be transmitted (step B22), transmits it to the FTP server 3 (step B23), and determines whether the image data that has not yet been transmitted exists in the backup memory unit 40 (step B24).

When determining "No" in step B23, that is, determining that the image data that has not yet been transmitted does not exist in the backup memory unit 40, the FTP client transmission processing task returns to step B21 and waits for a next transmission request.

In this manner, the FTP client transmission processing task of the communication interface unit 30 repeats the procedure from steps B21 to B24 in normal time in which a failure does not occur in the network line to receive, from the signal processing unit 20 at a predetermined time interval NI (6 seconds, for example), the JPEG compressed image data to be transmitted so as to transmit it to the FTP server 3.

When a failure has occurred in the network line, the FTP client transmission processing task of the communication interface unit 30 cannot complete the FTP client transmission processing of the JPEG compressed image data received from the signal processing unit 20. Then, the FTP client transmission processing task monitors the state of the network 2 until the network line has recovered with the FTP client transmission processing being in execution. At the time point when the network line has recovered, the FTP client transmission processing task transmits the remaining image data to end the FTP client transmission processing. After that, the FTP client transmission processing task shifts to step B23 and determines whether the image data that has not yet been transmitted exists in the backup memory unit 40 (step B24).

When determining "Yes" in step B23, that is, determining that the image data that has not yet been transmitted exists in the backup memory unit 40, the FTP client transmission processing task introduce a delay of a predetermined time interval BI (3 seconds, for example) (step B25) and reads out, from the backup memory unit 40, the image data that has not yet been transmitted (step B26). After that, the FTP client transmission processing task returns to step B22, and transmits the read out image data to the FTP server 3 (step B23).

In this manner, the FTP client transmission processing task of the communication interface unit 30 repeats the procedure from steps B23 to B26 at the time of recovery of the network line to read out, from the backup memory unit 40, the image data that has not yet been transmitted at a predetermined time interval BI (3 seconds, for example) starting from the oldest image data, and transmits it to the FTP server 3.

When determining "No" in step B23, that is, determining that the image data that has not yet been transmitted does not exist in the backup memory unit 40, the FTP client transmission processing task returns to step B21 and performs normal transmission processing by repeating the procedure from steps B21 to B24.

In this embodiment, at the time of recovery, the image data that has not yet been transmitted is read out from the backup memory unit 40 starting from the oldest image data and transmitted to the FTP server 3 without disrupting time-series of the image data. However, it is possible to alternately transmit, at a predetermined time interval NI (6 seconds, for example), the real-time image data sequentially stored in the backup memory unit 40 and the image data that has not yet been transmitted and stored at the time of occurrence of the failure. In this case, although the image data to be transmitted at the time of recovery appears out of imaging order to disrupt time-series, the use of imaging time information as a file name of the image data can arrange, on the FTP server side, the image data according to time-series.

As described above, in the client/server system 100 according to the embodiment, the relationship between NI (Normal Interval: transmission time interval at normal transmission processing time) and BI (Backup Interval: transmission time interval when the image data that has been backed up exists in the backup memory unit 40) meets BI<NI, that is, transmission time interval BI when the image data that has been backed up exists in the backup memory unit 40 is smaller than transmission time interval NI at normal transmission processing time. Accordingly, the transfer rate at which the image is transmitted to the FTP server 3 is higher than the image generation rate, which allows all backup images to be transmitted to the FTP server 3 when a predetermined time has elapsed with the set time intervals. As a result, memory capacity can be secured for backup of image data when a network failure newly occurs.

This also allows transfer bandwidth for the backup image to be controlled in accordance with processing capacity of the FTP server 3 or bandwidth used in the network line.

Figure 9:
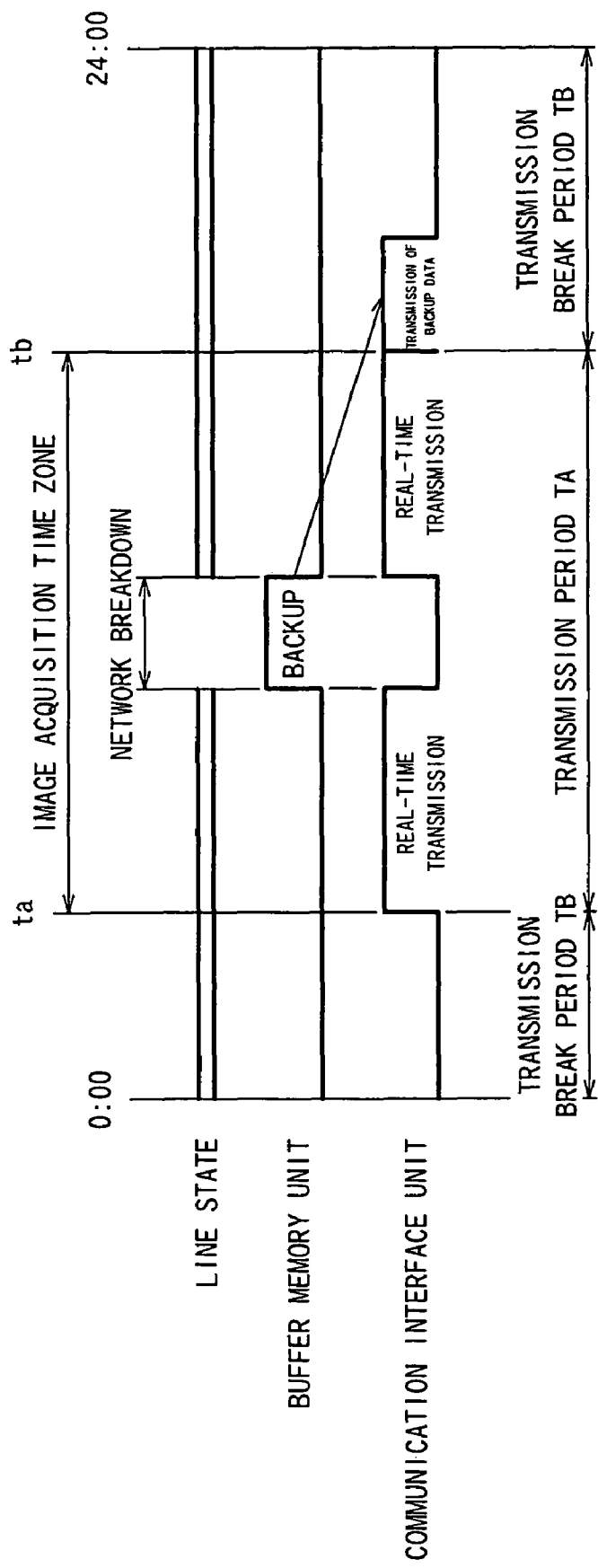
FIG. 9 is a time chart showing a processing flow when a transmission period during which image data is transmitted in real time and a transmission break period during which real-time transmission is not performed are provided, and backed up image data is transmitted during the transmission break period.

Further, by setting BI=NI, that is, by setting the transmission time interval BI when the image data that has been backed up exists in the backup memory unit 40 equal to the transmission time interval NI at normal transmission processing time, the following processing can be realized. For example, as shown in FIG. 9, image acquisition time zone (transmission period TA) and another time zone where image acquisition is not performed (transmission break period TB) are set from time ta to time tb, and from time tb to time ta of the next day, respectively. This makes it possible to transmit the image data that has backed up due to a failure of the network line during the transmission break point TB. As a result, it is possible to transmit the backup image data to the FTP server 3 without excessively burdening processing capacity of the FTP server 3 or bandwidth used in the network line.

In the above case, the system control unit 50 of the network camera 1 in the client/server system 100 sets a transmission period TA in which image data is transmitted in real time to the FTP server 3 connected thereto via the network 2 and a transmission break period TB in which the real-time transmission is not performed. When the compressed image data exists in the backup memory unit 40, the system control unit 50 controls transmission processing such that the compressed image data is transmitted to the FTP server 3 via the communication interface unit 30 during the transmission time period TB.

Figure 10:
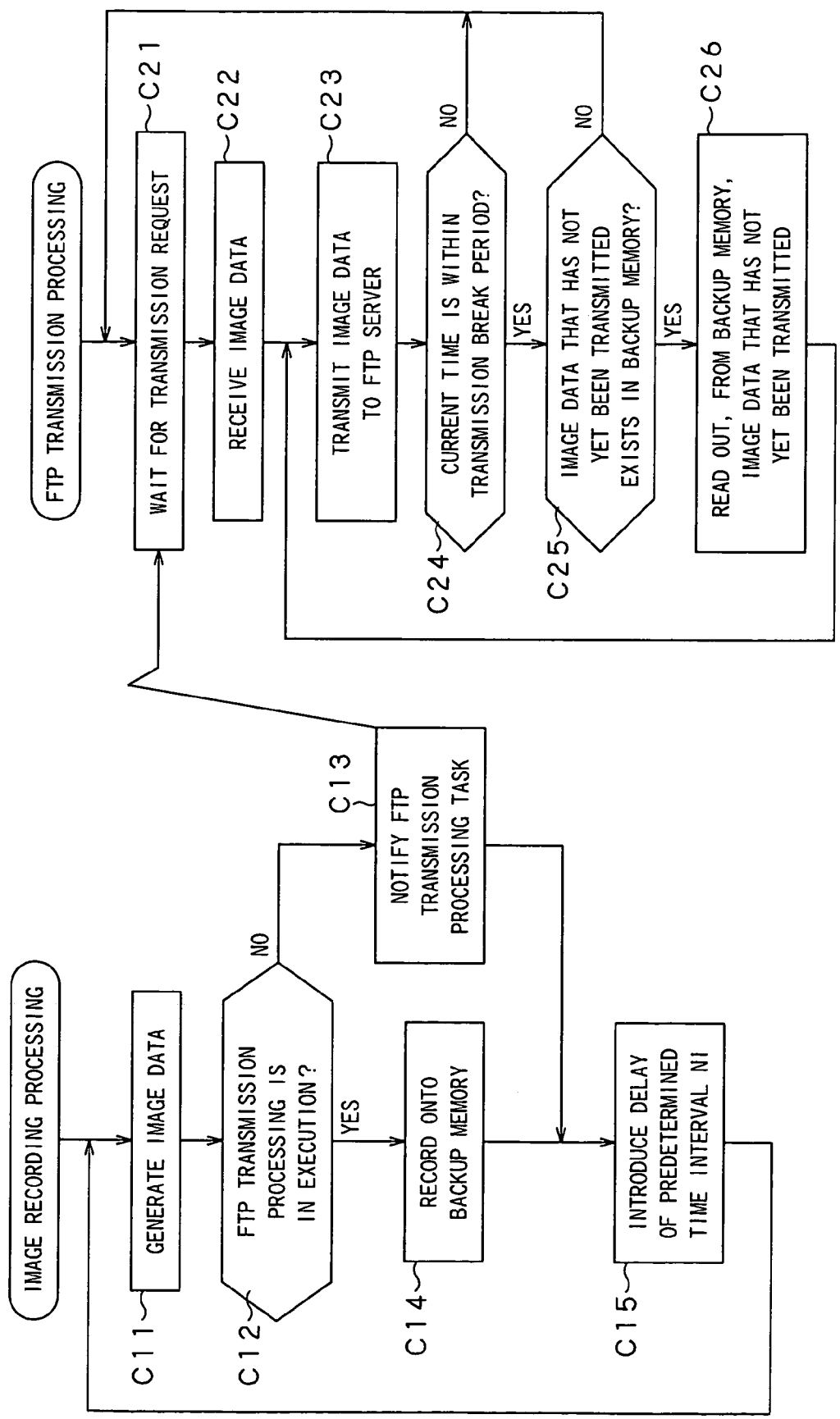
FIG. 10 is a flowchart shoeing a procedure of transmission processing when a transmission period during which image data is transmitted in real time and a transmission break period during which real time transmission is not performed are provided.

That is, the system control unit 50 repeats image recording processing (steps C11 to C15) and FTP transmission processing (steps C21 to C26) according to the procedure shown in the flowchart of FIG. 10. As a result, image data is backed up on the backup memory unit 40 only during network downtime. The compressed image data is transmitted to the FTP server 3 via the communication interface unit 30 during the transmission break period TB when the existence of the compressed image data stored in the backup memory unit 40 is confirmed.

In the image recording processing, when the JPEG compressed image data to be transmitted is generated by the signal processing unit 20 from an imaging output of the camera block 10 obtained in real time (step C11), the system control unit 50 determines whether FTP client transmission processing is being executed by the communication interface unit 30 (step C12). When determining "No" in step C12, that is, determining that the FTP client transmission processing has been completed, the system control unit 50 notifies the FTP client transmission processing task of the communication interface unit 30 that JPEG compressed image data has been generated (step C13). When determining "Yes" in step C12, that is, determining that the FTP client transmission processing is in execution, the system control unit 50 writes the JPEG compressed image data to be transmitted into the backup memory unit 40 (step C14). After introducing a delay of a predetermined time interval (6 seconds, for example) (step C15), the system control unit 50 returns to step C11.

In the image recording processing, the system control unit 50 repeats the procedure from steps C11 to C15 (through steps C12 and C13) in normal time in which a fault does not occurs in the network line to notify, at a predetermined time interval (6 seconds, for example), the FTP client transmission processing task of the communication interface unit 30 that the JPEG compressed image data to be transmitted is generated.

Further, in the image recording processing, when a failure has occurred in the network line and thereby the FTP client transmission processing is not ended, the system control unit 50 repeats the procedure from steps C11 to C15 (through steps C12 and C14) to store the JPEG compressed image data to be transmitted that is generated, at a predetermined time interval (6 seconds, for example), by the signal processing unit 20 in the backup memory unit 40.

The FTP client transmission processing task of the communication interface unit 30 waits for a transmission request (step C21). When receiving the transmission request, the FTP client transmission processing task receives, from the signal processing unit 20, the JPEG compressed image data to be transmitted (step C22), transmits it to the FTP server 3 (step C23), and determines whether the current time is within the transmission break period every time the FTP client transmission processing is ended (step C24). When the current time is out of the transmission break period, the FTP client transmission processing task returns to step C21 and waits for a next transmission request.

In this manner, the FTP client transmission processing task of the communication interface unit 30 repeats the procedure from steps C21 to C24 in normal time in which a failure does not occur in the network line to receive, from the signal processing unit 20 at a predetermined time interval (6 seconds, for example), the JPEG compressed image data to be transmitted and transmits it to the FTP server 3.

When a failure has occurred in the network line, the FTP client transmission processing task of the communication interface unit 30 cannot complete the FTP client transmission processing of the JPEG compressed image data received from the signal processing unit 20. Then, the FTP client transmission processing task monitors the state of the network 2 until the network line has recovered with the FTP client transmission processing being in execution. At the time point when the network line has recovered, the FTP client transmission processing task transmits the remaining image data to end the FTP client transmission processing. After that, the FTP client transmission processing task shifts to step C24 and determines whether the current time is within the transmission break period. When the current time is out of the transmission break period, the FTP client transmission processing task returns to step C21 and waits for a next transmission request.

When determining, in step C24, that the current time is within the transmission break period, the FTP client transmission processing task determines whether the image data that has not yet been transmitted exists in the backup memory unit 40 (step C25).

When determining "Yes" in step C25, that is, determining that the image data that has not yet been transmitted exists in the backup memory unit 40, the FTP client transmission processing task reads out, from the backup memory unit 40, the image data that has not yet been transmitted (step C26), and transmit it to the FTP server 3 after shifting to step C22. The FTP client transmission processing task repeats the procedure from steps C23 to C26 to read out, from the backup memory unit 40 at a predetermined time interval NI (for example, 6 seconds), the image data that has not yet been transmitted so as to transmit it to the FTP server 3.

That is, the image data stored in the backup memory unit 40 during the network breakdown is read out from the backup memory unit 40 during the transmission break period TB, followed by being transmitted to the FTP server 3.

In this case, although the transmission of the image data that has been stored in the backup memory unit 40 during network breakdown is performed after that of the image data in normal time in which a fault does not occur in the network line, the use of imaging time information as a file name of the image data can arrange, on the FTP server 3 side, the image data according to time-series.

Further, in the client/server system 100, it is possible to allow the system control unit 50 to switch between a first control mode in which the transmission interval at which the compressed image data is transmitted to the FTP server 3 via the communication interface unit 30 is made variable, and the compressed image data stored in the backup memory unit 40 is transmitted at a transmission interval BI shorter than a normal transmission interval NI at the time of recovery of the network 2 and a second control mode in which a transmission period TA during which image data is transmitted in real time to the FTP server 3 connected to the network camera 1 via the network 2 and a transmission break period TB during which the real time transmission is not performed are provided, and the compressed image data is transmitted to the FTP server 3 via the communication interface unit 30 during the transmission break period TB when the compressed image data exists in the backup memory unit 40.

What is claimed is:

1. A network camera configured to transmit image data in real time to a server connected thereto via a network comprising:
    a single imaging means;
    data compression means for converting the image data obtained by the single imaging means into compressed image data;
    network interface means for communicating with the server via the network;
    control means for controlling transmission processing and setting a transmission interval having a first delay interval of a first predetermined length of time and setting a second delay interval of a second predetermined length of time, such that the compressed image data obtained by the data compression means is transmitted to the server via the network interface means during the first delay interval, the transmission interval being the sum of the first delay interval followed sequentially by the second delay interval; and
    data store means for storing, during the first delay interval, the compressed image data to be transmitted to the server when a failure occurs in the network and the compressed image data cannot be transferred in real time to the server,
    wherein the control means that monitors the state of the network stores the compressed image data to be transmitted to the server in the data store means only when a failure occurs in the network,
    wherein, upon recovery of the network, the control means controls transmission processing such that only the compressed image data that has been stored in the data store means is transmitted to the server during the second delay interval, and
    wherein the second delay interval is set equal to the first delay interval when image data exists in the data store.

2. The network camera according to claim 1, wherein the transmission interval at which the compressed image data is transmitted to the server via the network interface means is made variable, and the control means controls transmission processing such that the compressed image data that has been stored in the data store means is transmitted at a transmission interval shorter than a normal transmission interval at the time of recovery of the network.

3. The network camera according to claim 1, wherein there is a transmission period during which image data is transmitted in real time and a transmission break period during which image data is not transmitted in real-time, and wherein the control means controls transmission processing such that, when compressed image data exists in the data store means, the stored image data is transmitted during the transmission break period.

4. The network camera according to claim 1, wherein the control means switch between;
    a first control mode in which the transmission interval at which the compressed image data is transmitted to the server via the network interface means is made variable and the compressed image data that has been stored in the data store means is transmitted at a transmission interval shorter than a normal transmission interval at the time of recovery of the network; and a second control mode in which there is a transmission period during which image data is transmitted in real time and a transmission break period during which image data is not transmitted in real-time, and wherein the control means controls transmission processing such that, when compressed image data exists in the data store means, the stored image data is transmitted during the transmission break period.

\* \* \* \* \*